(12) United States Patent
Khanlarov et al.

(10) Patent No.: US 9,579,948 B2
(45) Date of Patent: Feb. 28, 2017

(54) FASTENING DEVICE

(71) Applicants: Dr. Ing. h.c. F. Porsche Aktiengesellschaft, Stuttgart (DE); Volkswagen AG, Wolfsburg (DE)

(72) Inventors: Jafar Khanlarov, Weissach-Flacht (DE); Christoph Lenniger, Stuttgart-Rohr (DE); Hartmut Rechter, Weddel (DE)

(73) Assignees: Dr. Ing h.c. F. Porsche AG, Stuttgart (DE); Volkswagen AG, Wolfsburg (DE)

( * ) Notice: Subject to any disclaimer, the term of this patent is extended or adjusted under 35 U.S.C. 154(b) by 0 days.

(21) Appl. No.: 14/939,545

(22) Filed: Nov. 12, 2015

(65) Prior Publication Data

US 2016/0137018 A1 May 19, 2016

(30) Foreign Application Priority Data

Nov. 17, 2014 (DE) .................. 10 2014 116 755

(51) Int. Cl.
*B60G 21/055* (2006.01)

(52) U.S. Cl.
CPC ....... *B60G 21/0551* (2013.01); *B60G 21/055* (2013.01); *B60G 2202/135* (2013.01); *B60G 2204/1222* (2013.01); *B60G 2204/4307* (2013.01)

(58) Field of Classification Search
CPC ............. B60G 21/0551; B60G 21/055; B60G 2204/122; B60G 2204/4307; B60G 2202/135

See application file for complete search history.

(56) References Cited

U.S. PATENT DOCUMENTS

| | | | | | |
|---|---|---|---|---|---|
| 2,279,865 | A | * | 4/1942 | Ellinwood | F16L 3/1233 174/40 CC |
| 4,033,605 | A | * | 7/1977 | Smith | B60G 21/0551 267/276 |
| 5,520,465 | A | * | 5/1996 | Kammel | B60G 21/0551 267/293 |
| 5,565,251 | A | * | 10/1996 | Tang | B29C 47/0019 267/141.2 |

(Continued)

FOREIGN PATENT DOCUMENTS

| | | | | |
|---|---|---|---|---|
| DE | EP 1391333 A2 | * | 2/2004 | ......... B60G 21/0551 |
| DE | 102004056884 A1 | * | 6/2006 | ......... B60G 21/0551 |

(Continued)

OTHER PUBLICATIONS

German Search Report with partial English translation for 102014116755.4, dated Jul. 3, 2015, 3 pages.

*Primary Examiner* — Karen Beck
(74) *Attorney, Agent, or Firm* — RatnerPrestia

(57) ABSTRACT

A fastening device for mounting a stabilizer on a motor vehicle body, having a stabilizer mount, which can be placed around the stabilizer, for transferring torsional forces from the stabilizer to the vehicle body, a fastening body for receiving the stabilizer mount, and a fastener for fastening the fastening body on a subframe, wherein the fastening body and the fastener are designed in such a way that the fastener serves to fasten the subframe on the motor vehicle body.

12 Claims, 3 Drawing Sheets

(56) References Cited

U.S. PATENT DOCUMENTS

| | | | | |
|---|---|---|---|---|
| 6,241,225 B1* | 6/2001 | Krause | ............... | B60G 21/0551 267/292 |
| 6,971,640 B2* | 12/2005 | Joseph | ............... | B60G 21/0551 267/141 |
| 7,108,254 B2* | 9/2006 | Kumper | ............ | B60G 21/0551 267/276 |
| 7,380,775 B2* | 6/2008 | Niwa | ................. | B60G 21/0551 267/293 |
| 7,594,670 B2* | 9/2009 | Dundon | ................... | B60G 7/02 280/124.106 |
| 7,635,139 B2* | 12/2009 | Narishima | ......... | B60G 21/0551 280/124.13 |
| 7,828,308 B2* | 11/2010 | Hansson | ........... | B60G 21/0551 267/140.12 |
| 8,292,312 B2* | 10/2012 | Kato | ................. | B60G 21/0551 267/141.1 |
| 9,278,603 B2* | 3/2016 | Yoshizawa | ........... | B60G 21/055 |
| 2006/0091595 A1* | 5/2006 | Hayashi | ............. | B60G 21/0551 267/276 |
| 2007/0161987 A1* | 7/2007 | Capote | ............... | A61B 17/7037 606/86 A |
| 2009/0072099 A1* | 3/2009 | Trotter | ............... | B60G 21/0551 248/74.1 |
| 2014/0291084 A1* | 10/2014 | Hertz | ........................ | F16F 9/54 188/266 |
| 2015/0008630 A1* | 1/2015 | Ishimatsu | ............. | F16F 1/3835 267/279 |

FOREIGN PATENT DOCUMENTS

| | | | | |
|---|---|---|---|---|
| DE | 102005028621 A1 * | 12/2006 | ......... | B60G 21/0551 |
| DE | EP 1998069 A2 * | 12/2008 | ......... | B60G 21/0551 |
| EP | 2050597 | 4/2009 | | |
| FR | 2810275 | 12/2001 | | |
| FR | 2963583 | 2/2012 | | |
| TR | WO 2015088459 A1 * | 6/2015 | ......... | B60G 21/0551 |
| WO | 2012038659 | 3/2012 | | |

* cited by examiner

FASTENING DEVICE

CROSS-REFERENCE TO RELATED APPLICATION

This application claims priority to German Patent Application No. 10 2014 116 755.4, filed Nov. 17, 2014, which is incorporated by reference herein in its entirety.

FIELD OF THE INVENTION

The present invention relates to a fastening device and to a system for connecting, in particular pivotably fastening, a stabilizer to a motor vehicle body.

BACKGROUND OF THE INVENTION

The use of fastening devices for pivotably fastening a stabilizer to a motor vehicle body is known. In this context, the stabilizer is an element in a motor vehicle which serves to cushion movements of opposite wheels and thus to improve road holding. It connects the opposite wheels by means of two short levers and a central piece situated in between, usually in the form of a torsion bar spring. The spring action of the stabilizer derives from the twisting (torsion) of the central piece, which is generally made of a strong material, in order to transmit the rotary motion of the wheels reliably to each other. Here, the torsion bar spring is mounted underneath the vehicle body of the motor vehicle so as to be capable of being turned in such a way that the torsional forces can be transferred from the stabilizer to the body. The angled ends, which act as levers, are firmly connected to the wheels or the wheel suspension systems, thus allowing the levers to transmit the movement of the wheels to the central piece. When one wheel is raised, the opposite wheel is likewise raised owing to the twisting of the stabilizer, and is likewise lowered when the first is lowered. As a result, the rolling of the body is counteracted in the presence of irregularities in the road and/or during cornering. In the case of known stabilizers, the central piece is fastened with the ability to turn on the subframe by means of fasteners. For this purpose, the conventional fastening devices have two clamp elements, which are screwed to the subframe on both wheel sides with the aid of two screws in each case. The subframe is, in turn, screwed to the body of the motor vehicle with the aid of further screws.

The disadvantage with the known fastening devices is, on the one hand, that they require a large number of component elements to fasten the stabilizer on a motor vehicle body. On the other hand, it is disadvantageous that the assembly of such fastening devices is complex and requires a number of assembly steps. It is furthermore disadvantageous that the fastening devices require a large amount of installation space.

SUMMARY OF THE INVENTION

Described herein is a fastening device and a system for mounting a stabilizer on a motor vehicle body which is of uncomplicated construction, needs fewer component elements, requires a small number of assembly steps and is simple to assemble.

The fastening device is utilized for mounting, in particular pivotably fastening, a stabilizer on a motor vehicle body, which fastening device is equipped with a stabilizer mount, which can be placed around the stabilizer, for transferring torsional forces from the stabilizer to the vehicle body, a fastening body for receiving the stabilizer mount, and a fastening means for fastening the fastening body on a subframe, wherein the fastening body and the fastening means are designed in such a way that the fastening means serves to fasten the subframe on the motor vehicle body. In this case, the stabilizer mount selected can be any desired pivot bearing which allows torsion of the stabilizer.

The fastening device provided is designed in such a way that the stabilizer is fastened to the subframe and the subframe to the vehicle body with the aid of just one fastening means, in particular a fastening screw. Here, the fastening means according to aspects of the invention, in the form of a single component element, serves simultaneously as a means of fastening the stabilizer on the subframe and as a means of fastening the subframe on the vehicle body. Here, therefore, the fastening means performs a dual function. For this purpose, the fastening body according to aspects of the invention is shaped in such a way as to receive the stabilizer mount, on the one hand, and to guide the fastening means for dual fastening, on the other. In other words, the fastening body according to aspects of the invention is shaped to enable this dual function of the fastening means. Consequently, several advantages can be achieved, such as a reduction in the component elements required, simplification of the fastening device, a reduction in the required assembly steps and optimum usage of the available installation space.

It may be advantageous if the fastening body can be in the form of a clamp having an opening, in particular a circular opening, for receiving the stabilizer mount. Here, the fastening body according to aspects of the invention can surround the stabilizer mount and the stabilizer pivotably accommodated therein and, in particular, can be clamped around it. Pivotable mounting of the stabilizer on the subframe can thus be ensured by subsequently fastening the fastening body on the subframe. Depending on the shape of the stabilizer, in particular of the central piece of the stabilizer, whether in the form of a rod with a round or a rod with a flattened cross section, the fastening body can have a corresponding opening, which can be matched to the shape of the stabilizer, having a circular or oval opening or the like, for example.

Another advantage can be achieved if the fastening body can be of two-part design. It is then easier to open and close the fastening body to receive the stabilizer mount, to remove it for maintenance or to replace it. Particularly in conjunction with a clamp shape, the two-part fastening body can provide simpler handling of the fastening device.

According to aspects of the invention, provision can be made for the fastening body to have two halves, in particular two identical halves, e.g. arc-shaped halves. Consequently, the fastening body can not only allow simple handling and assembly of the stabilizer but can also be simple to produce.

It can furthermore be advantageous if the fastening body is closed at an end adjacent to the stabilizer mount, in particular if the halves can be connected to one another in a materially unitary and/or materially bonded way at an end adjacent to the stabilizer mount, and if the fastening body can be open at an end adjacent to the fastening means. In this case, the two halves can be adhesively bonded to one another at an end adjacent to the stabilizer mount, or they can have a narrow web between them, allowing the halves to be pushed apart to receive the stabilizer mount and joined together again after the stabilizer mount has been inserted. It is conceivable here for the halves to be preloaded in a direction toward one another in order to enclose the stabilizer mount positively and/or nonpositively. It is furthermore conceivable for the diameter and/or the circumference of the opening of the fastening body to be smaller than or equal to the diameter and/or the circumference of the stabilizer mount in cross section. To insert the stabilizer mount, the halves can then be pushed apart, allowing the stabilizer mount to be inserted, in particular pressed, into the opening through the open end. Consequently, a releasable connection can advantageously be created between the fastening body and the stabilizer mount. At the same time, it is likewise conceivable, as an alternative, for the stabilizer mount to be mounted permanently on the fastening body, in particular being molded, adhesively bonded or welded on.

According to aspects of the invention, the fastening means can be in the form of a screw. For this purpose, the fastening body, in particular the halves, can have a guide, in particular a threaded guide, for receiving the fastening means at an end adjacent to the fastening means. According to aspects of the invention, the fastening means, in particular the fastening screw, can be passed through the fastening body and clamp the fastening body or the halves to one another, as with an adjusting screw.

In addition, provision can be made, according to aspects of the invention, to enable the fastening body, in particular the halves, to be clamped by turning the fastening means, in particular fastening screw, more specifically in such a way that the inside diameter of the opening can be reduced. In this case, the stabilizer mount can be press-fitted in the fastening body, in particular in the opening of the fastening body, thus limiting, in particular preventing, axial movement of the stabilizer, and thus only allowing the stabilizer to be turned within the stabilizer mount but not to be moved axially. Consequently, it is possible to enable the stabilizer to be attached pivotably to the vehicle body, in particular to the subframe.

Another advantage of the invention can be achieved if the fastening body can be formed from a plastic, in particular rubber. It is thus possible to enable the fastening body to have a low weight and to be produced in a simple and advantageous manner, e.g. by means of injection molding.

Provision can furthermore advantageously be made to enable the fastening body to be connected positively and/or nonpositively and/or by material bonding to the stabilizer mount. It is conceivable here for the stabilizer mount to be formed directly on the fastening body or connected directly thereto or that it should be capable of being held purely by nonpositive press-fitting.

In this case, the stabilizer mount can be of multi-part, in particular two-part, preferably four-part, design. The parts of the stabilizer mount can advantageously be fastened on the inside of the fastening body, in particular in the opening of the fastening body. It is then possible, by mounting the stabilizer in the fastening body, for it simultaneously to be mounted in the stabilizer mount. It is conceivable here for the parts of the stabilizer mount to be designed as segments, which can be attached to the inside of the fastening body, in particular, being spaced apart. It is thus possible to ensure that, after the closure of the fastening body and, in particular, after the reduction in the diameter of the opening, the parts of the stabilizer mount are connected to one another in order to enclose the stabilizer fully.

It can furthermore be advantageous if the stabilizer mount is of multi-layer, in particular two-layer, preferably four-layer, design. In this way, it is possible to ensure that different layers of the stabilizer mount can perform different functions. Thus, some layers of the stabilizer mount can provide better and more stable support for the stabilizer, while others lead to a reduction in noise when the stabilizer is in use, and entail further advantages. Conceivable advantages here are those such as weight reduction, stability of the pivoting motion of the stabilizer and better transfer of the torsional forces to the vehicle body.

Provision can furthermore be made for the stabilizer mount to have at least one, in particular two, rubber layers and, in particular, for at least one rubber layer to be arranged between two metal layers. Here, the rubber layer can ensure that the stabilizer can pivot or turn through stretching of the rubber layer, while the metal layers can simultaneously contribute to the provision of better retention of the stabilizer. Thus, it is possible to achieve improved operation of the stabilizer during pivoting, to avoid squeaking noises and to ensure better attachment of the stabilizer to the stabilizer mount.

According to aspects of the invention, provision can be made to enable the stabilizer mount to be connected positively and/or nonpositively to the stabilizer. According to aspects of the invention, the stabilizer can be held in the stabilizer mount by means of press-fitting, thus making it possible reliably to prevent sliding along the axis of the stabilizer. Moreover, provision can be made to enable the stabilizer to be connected to the stabilizer mount, in particular to an inner layer of the stabilizer mount, by an additional means, e.g. by means of an adhesive.

The present invention likewise relates to a system for mounting a stabilizer on a motor vehicle body, having at least one fastening device, in particular as described above, a stabilizer for cushioning movements of opposite wheels, a stabilizer mount, which can be placed around the stabilizer, for transferring torsional forces from the stabilizer to the vehicle body, a fastening body for receiving the stabilizer mount, a subframe for supporting the motor vehicle body, and a fastening means for fastening the fastening body on the subframe, wherein the fastening body and the fastening means are designed in such a way that the fastening means can serve to fasten the subframe on the motor vehicle body.

It is advantageous here that the system according to aspects of the invention requires few component elements to support the stabilizer pivotably on the subframe, that the system can be of simple design, that the system can be constructed with a minimum of assembly steps and that the system can make optimum use of the available installation space.

BRIEF DESCRIPTION OF THE DRAWINGS

Further advantages, features and details of the invention will emerge from the following description, in which an illustrative embodiment of the invention is described in detail with reference to the drawings. Here, the features mentioned in the claims and in the description may be essential to the invention either individually or in any combination. In the drawing, which is schematic:

DETAILED DESCRIPTION OF THE INVENTION

Figure 1:
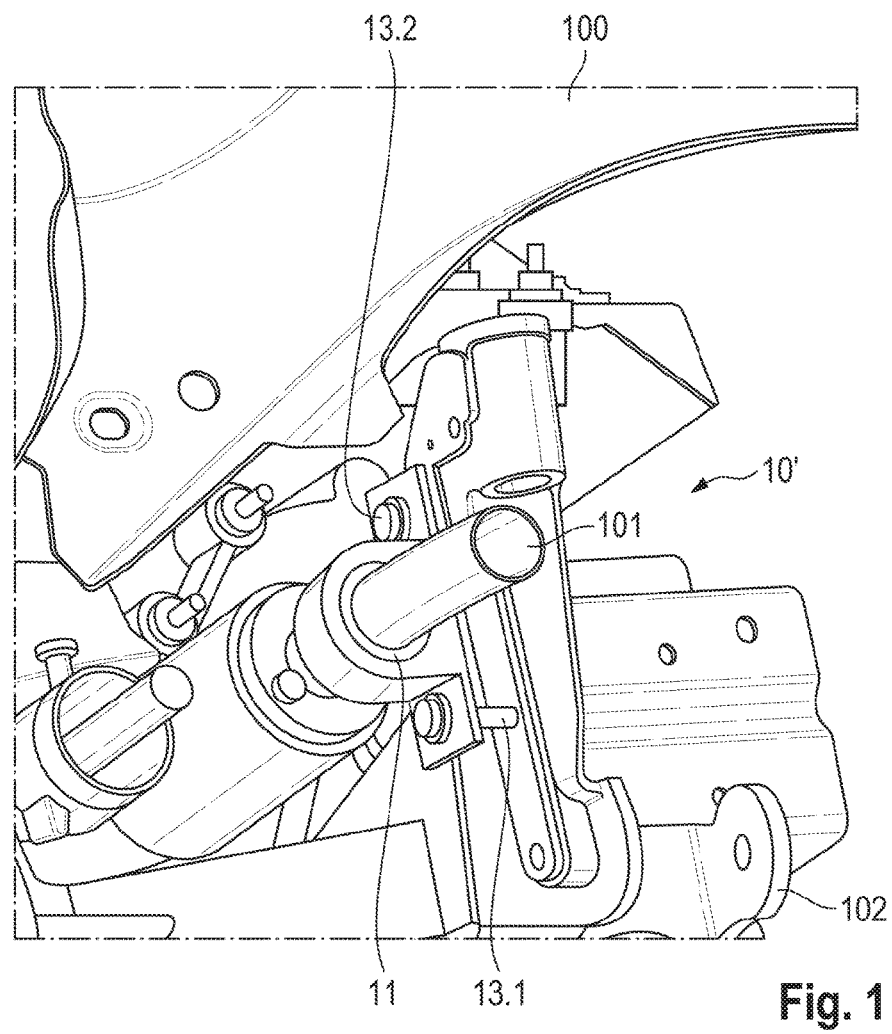
FIG. 1 shows a perspective view of a conventional fastening device.
Figure 2:
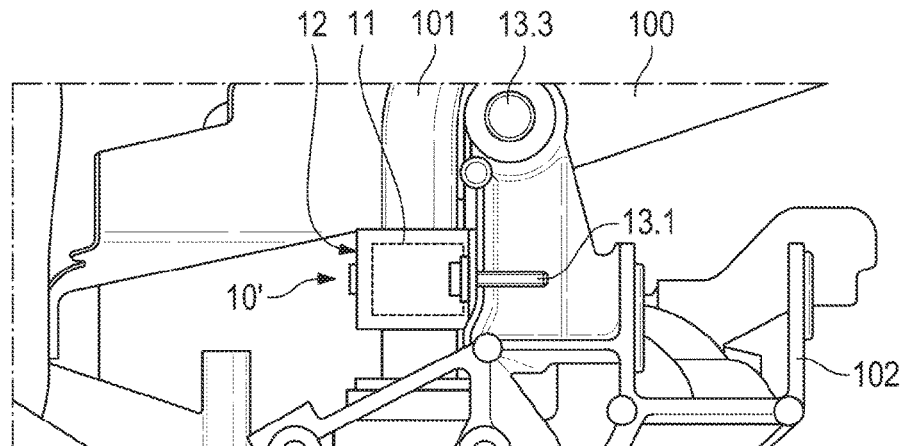
FIG. 2 shows a side view of the conventional fastening device.

FIGS. 1 and 2 show how a conventional fastening device 10' for pivotable fastening of a stabilizer 101 on a motor vehicle body 100 is normally designed. FIG. 1 serves to give a perspective illustration of the fastening device 10', wherein FIG. 2 shows the fastening device 10' from the side. Here, the fastening device 10' is equipped with a stabilizer mount 11, which can be placed around the stabilizer 101, for transferring torsional forces from the stabilizer 101 to the vehicle body 100, a fastening body 12 for receiving the stabilizer mount 11, and a plurality of fastening screws 13.1, 13.2, 13.3. As is made clear in FIG. 1, two fastening screws 13.1, 13.2 are used for fastening the fastening body 12 on a subframe 102, and as illustrated in FIG. 2, a third fastening screw 13.3 serves to fasten the subframe 102 on the motor vehicle body 100. However, the conventional fastening device 10' shown has a number of disadvantages, such as too many component elements (three fastening screws 13.1, 13.2, 13.3) for fastening the stabilizer 101 on the motor vehicle body 100, complex assembly, which requires several assembly steps, in this case at least three, and suboptimal usage of the available installation space.

Figure 3:
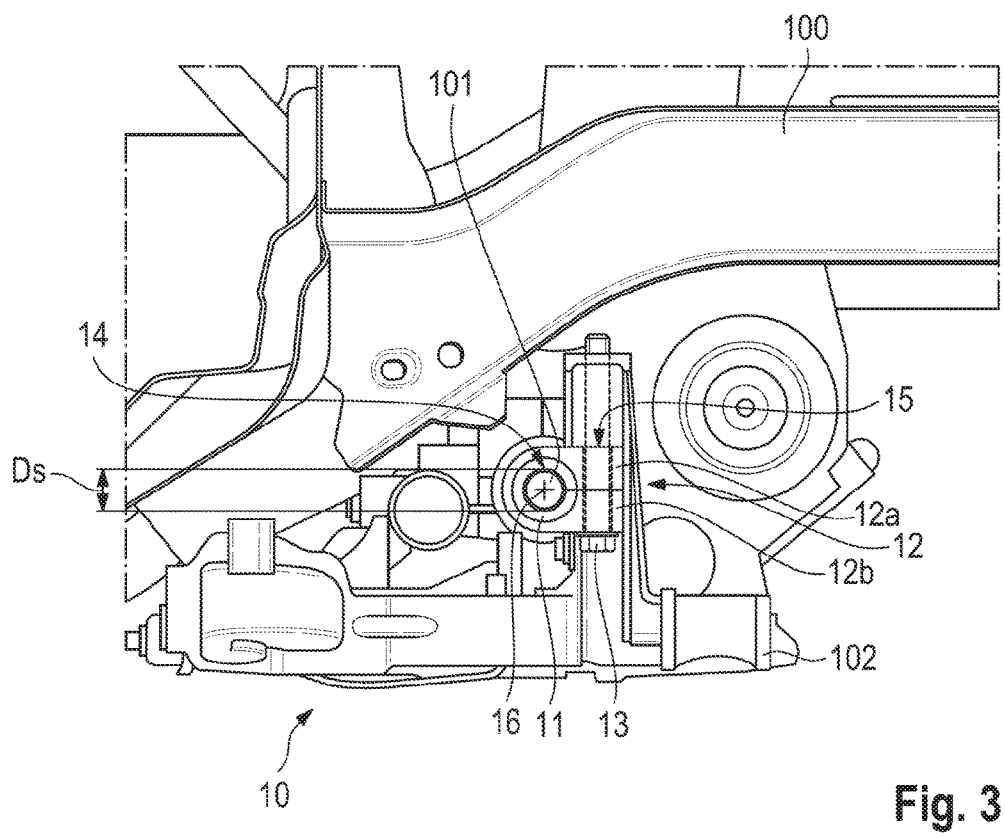
FIG. 3 shows a side view of a system according to aspects of the invention having a fastening device according to aspects of the invention.
Figure 4:
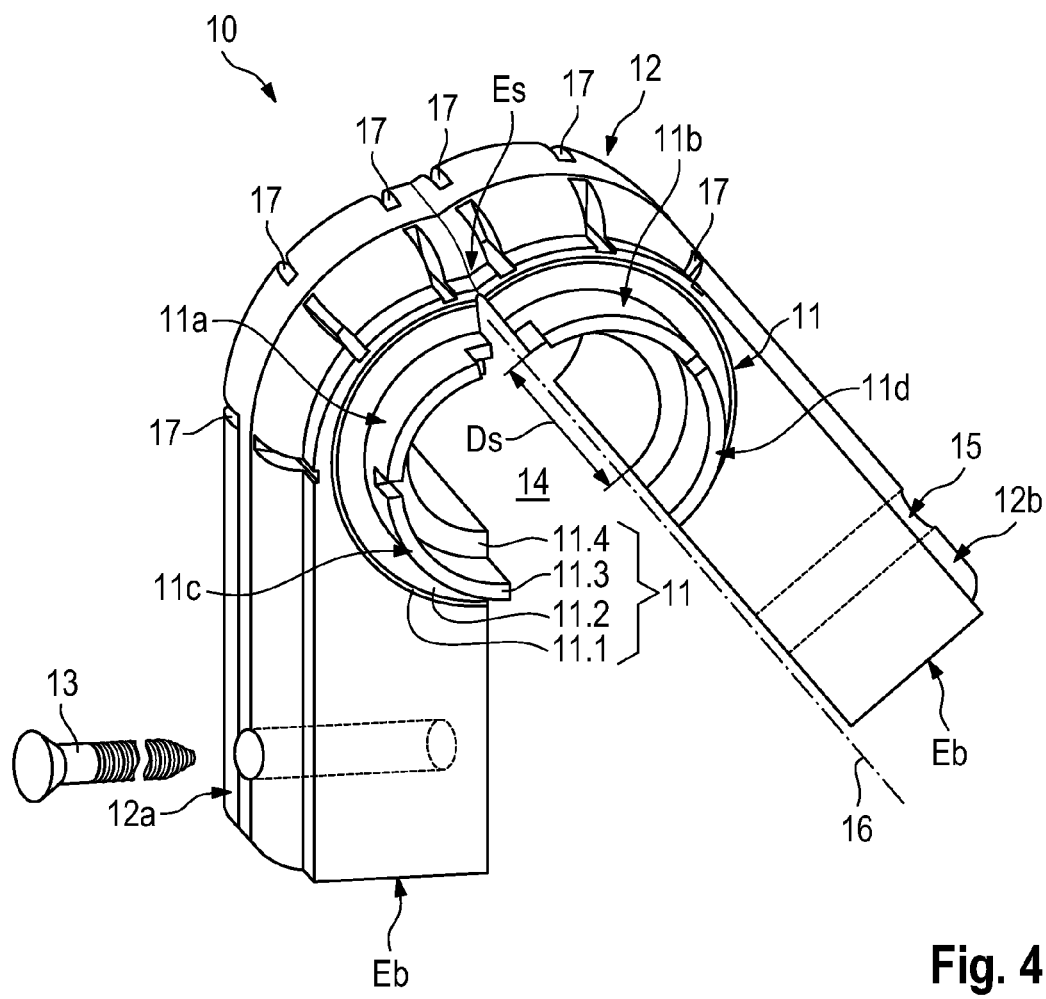
FIG. 4 shows an enlarged illustration of the fastening device according to aspects of the invention.

In contrast, particularly in contrast to the conventional fastening device 10', which is shown in FIGS. 1 and 2, the fastening device 10 according to aspects of the invention as shown in FIGS. 3 and 4 offers an improved design, which is of simpler configuration than the conventional fastening device 10', is easier to assemble and requires only a small number, in particular just one, assembly step.

Here, FIG. 3 shows a side view of the fastening device 10 according to aspects of the invention and the system according to aspects of the invention for pivotable fastening of a stabilizer 101 on a motor vehicle body 100. FIG. 4 shows the fastening device 10 according to aspects of the invention in an enlarged view for better understanding.

According to aspects of the invention and as is illustrated in FIGS. 3 and 4, the fastening device 10 is designed with a stabilizer mount 11, which can be placed around the stabilizer 101, for transferring torsional forces from the stabilizer 101 to the vehicle body 100, a fastening body 12 for receiving the stabilizer mount 11, and just one fastening means 13 for fastening the fastening body 12 on a subframe 102. At the same time, the single fastening means 13 serves to fasten the subframe 102 on the motor vehicle body 100. Here, the stabilizer mount 11 serves for pivotable reception of the stabilizer 101, wherein, in principle, any pivotable mounting may be suitable for the purposes of the invention, although the preferred mounting is shown in FIGS. 3 and 4 and described in detail below.

Here, the inventive concept consists in that just a single common fastening means 13, which is designed as a fastening screw 13 in the illustrative embodiment shown, is provided both for fastening the stabilizer 101 on the subframe 102 and for fastening the subframe 102 on the vehicle body 100. Here, the fastening means 13 performs a dual function. To make this possible, the fastening body 12 according to aspects of the invention and the fastening means 13 are shaped in such a way as to enable this dual function of the fastening means 13, as described below with the aid of FIGS. 3 and 4. The invention has several advantages over the prior art shown in FIGS. 1 and 2. In particular, the advantages consist in that the number of component elements, especially the fastening means, is reduced to just one, thereby simplifying the structure of the fastening device, that the required assembly steps are reduced to one, and that optimum use is made of the available installation space.

The fastening means 13 may be a screw (as shown), bolt, clip, clamp, pin, fastener, magnet, adhesive, weld, for example.

Here, the fastening body 12 according to aspects of the invention is in the form of a clamp 12 having a circular opening 14 for receiving the stabilizer mount 11 and thus the stabilizer 101. The opening 14 is likewise taken to mean the opening in the stabilizer mount 11 for the stabilizer 101. The stabilizer 101 shown in FIGS. 1 to 3 has a circular cross section. The opening 14 is therefore likewise designed with a corresponding circular cross section. However, if the stabilizer 101, in particular a central piece of the stabilizer 101, has some other cross section, e.g. a flattened oval cross section, the fastening body 12 according to aspects of the invention can likewise have a corresponding oval opening 14. Here, the axis 16 of the circular opening 14 shown coincides with the axis of extension of the stabilizer 101.

According to aspects of the invention, the fastening body 12 is of two-part design, having a first half 12a and a second half 12b, which can be opened at one end Eb, which points toward the fastening means 13, in order to introduce the stabilizer mount 11 and/or to remove it for the purpose of maintenance. Together, the halves 12a, 12b of the fastening body 12 form a kind of clamp in order to enclose the stabilizer mount 11. The halves 12a, 12b are of mirror-symmetrical and mutually identical design. At one end Es, in which the stabilizer 101 is received, the halves 12a, 12b have an arc shape, which defines the opening 14 for the stabilizer mount 11. At the ends Eb adjacent to the fastening means 13, the halves 12a, 12b have an elongate shape, wherein the two halves 12a, 12b are in surface contact at the ends Eb and form a common end Eb after the closure of the fastening body 12. At this end Eb, a threaded through opening 15 is provided, which extends through the first half 12a and the second half 12b. Here, the threaded opening 15 serves to receive the fastening means 13. In the illustrated illustrative embodiment of the invention, the fastening means 13 is a screw, which can be screwed into the threaded opening 15, in order to close the fastening body 12 at the end Eb. Here, the fastening screw 13 can act as an adjusting screw.

As shown in FIG. 4, the fastening body 12 is closed at an end Es adjacent to the stabilizer mount 11. In this case, the halves 12a, 12b are connected to one another by a narrow web. It is conceivable here for said web to be formed from the outset on the fastening body 12 by cutting a slot on the inside of the opening 14 or alternatively by materially bonded connection of the halves 12a, 12b. At the other end Eb, which is adjacent to the fastening means 13, the fastening body 12 is fundamentally open and can be closed by the introduction of the fastening means 13. In order to be able to push the halves 12a, 12b apart more effectively to receive the stabilizer mount 11, the fastening body 12 has external notches 17 at end Es. They can close as the fastening body 12 opens and widen again after the closure of the fastening body 12 in order to ensure better stability and flexibility of the fastening body 12.

Provision can furthermore be made according to aspects of the invention to enable the halves 12a, 12b to be preloaded in a direction toward one another so that they are pressed apart as the fastening body 12 opens and change automatically to the closed position, in particular snap shut, during the closure of the fastening body 12. It is thus possible to enable the stabilizer mount 11 to be clamped positively and/or nonpositively within the opening 14, thus preventing the stabilizer 101 from sliding to the left and right along the axis 16. According to aspects of the invention, provision can furthermore be made to enable the diameter Ds of the opening 14 to be somewhat smaller than the diameter of the stabilizer 11 in order to press in the stabilizer 101 in the opening 14. The stabilizer 101 can thus advantageously be reliably held and axially secured within the opening 14 simply by being clamped in.

Provision can furthermore be made according to aspects of the invention to enable the fastening body 12, in particular the halves 12a, 12b, to be clamped by turning the fastening screw 13, allowing the inside diameter Ds of the opening 14 to be reduced. Here, the stabilizer mount 11 can be press-fitted in the fastening body 12, with the result that the stabilizer 101 is secured axially and cannot slide along the opening 14, and with the result that the stabilizer 101 can only be pivoted within the stabilizer mount 11.

In this case, it is possible to envisage the fastening body 12 being formed from a plastic, in particular rubber. It is thereby possible to ensure that the fastening body 12 can have a low weight and can be produced simply and advantageously, e.g. by means of injection molding.

Between the fastening body 12 and the stabilizer mount 11 it is likewise possible here to provide a releasable connection, which can likewise be implemented by means of pressing in. However, it is likewise conceivable, as an alternative, that the stabilizer mount 11 can be formed, adhesively bonded or welded directly on the fastening body 12, thus enabling the stabilizer mount 11 and the fastening body 12 to form a common, monolithic component.

According to aspects of the invention, the stabilizer mount 11 can be of multi-part design. In the illustrative embodiment of the invention shown in FIG. 4, the stabilizer mount 11 is in four parts 11a, 11b, 11c, 11d. In this case, the parts 11a, 11b, 11c, 11d are arranged uniformly spaced apart in the form of segments within the opening 14. This helps to enable the distances between the segments or between the parts 11a, 11b, 11c, 11d to be reduced during the closure of the fastening body 12, thus allowing the diameter Ds of the opening 14 to become smaller and enabling the stabilizer 101 to be clamped in the stabilizer mount 11. According to aspects of the invention, provision can be made to enable the stabilizer mount 11, in particular the inner layer 11.4, to interact positively and/or nonpositively with the stabilizer 11. As an alternative or in addition, however, provision can be made to enable the stabilizer 101 to be additionally connected to the stabilizer mount 11, in particular to the inner layer 11.4 of the stabilizer mount 11, by adhesive bonding.

The parts 11a, 11b, 11c, 11d can furthermore be formed in just one layer 11.3 of the stabilizer mount 11, which can be formed from a harder material, for example, than the other layers 11.2, 11.4 of the stabilizer mount 11 and/or can be harder than the material of the fastening body 12. In this case, the parts 11a, 11b, 11c, 11d can be formed from metal and embedded or encapsulated between two rubber layers 11.2 and 11.4, for example. Moreover, a further, harder layer 11.1 of the stabilizer mount 11, likewise consisting of metal for example, can be provided externally, resting on the fastening body 12. Here, the layers 11.1, 11.2, 11.3, 11.4 can be formed integrally on the inside of the fastening body 12, especially in an injection molding process, and thus form the stabilizer mount 11. The advantage of a plurality of layers 11.1, 11.2, 11.3, 11.4 is, on the one hand, that the softer layers 11.2, 11.4 can serve to receive the stabilizer 101 reliably in a positive and nonpositive manner within the stabilizer mount 11 through compression of said softer layers 11.2, 11.4. On the other hand, the advantage of a plurality of layers 11.1, 11.2, 11.3, 11.4 is that the harder layers 11.1, 11.3 ensure optimum compression of the softer layers 11.2, 11.4 in a manner which preserves the shape thereof. Moreover, the softer layers 11.2, 11.4 can allow rotation of the stabilizer 101 relative to the axis 16 through elastic deformation, extension and/or twisting, while, at the same time, the internal surface of the outer layer 11.4 can rest reliably and in a slip-proof manner on the stabilizer 101. It is thus possible, according to aspects of the invention, to provide pivotable mounting of the stabilizer 101 in the stabilizer mount 11. The advantages of a plurality of layers 11.1, 11.2, 11.3, 11.4 are furthermore low weight, simplicity of production, apart from reliable retention of the stabilizer 101, which can be twisted in accordance with its function by virtue of the elastic properties of at least one of the softer layers 11.2, 11.4, without causing troublesome noise. As an alternative, it is also possible according to aspects of the invention for other variants of the pivotable mounting to be provided, e.g. a spherical mounting or the like.

The above explanation of the embodiment describes the present invention exclusively in the context of examples. Of course, individual features of the embodiment can be developed further, where technically worthwhile, without exceeding the scope of the present invention.

What is claimed is:

1. A system for mounting a stabilizer on a motor vehicle body, comprising:
   a subframe for supporting the motor vehicle body;
   the stabilizer for cushioning movements of opposite wheels of the motor vehicle;
   a fastening device for mounting the stabilizer on the motor vehicle body, said fastening device comprising: a stabilizer mount, which is configured to be placed around the stabilizer, for transferring torsional forces from the stabilizer to the vehicle body, a fastening body for receiving the stabilizer mount, and a fastener for fastening the fastening body on the subframe of the motor vehicle body,
   wherein the fastener is connected to the fastening body and also fastens the subframe to the motor vehicle body.

2. The system as claimed in claim 1, wherein the fastening body is in the form of a clamp having a circular opening for receiving the stabilizer mount.

3. The system as claimed in claim 1, wherein the fastening body is of two-part design having two halves.

4. The system as claimed in claim 3, wherein the fastening body is closed at an end adjacent to the stabilizer mount, the halves of the fastening body are connected to one another in a materially unitary and/or materially bonded way at the end adjacent to the stabilizer mount, and the fastening body is open at an end adjacent to the fastener.

5. The system as claimed in claim 3, wherein the fastener is a screw, and the halves of the fastening body have a threaded guide for receiving the fastener at an end adjacent to the fastener.

6. The system as claimed in claim 1, wherein the halves of the fastening body are configured to be clamped by turning the fastener, thereby reducing an inside diameter of an opening of the fastening for receiving the stabilizer mount.

7. The system as claimed in claim 1, wherein the fastening body is formed from plastic or rubber.

8. The system as claimed in claim 1, wherein the fastening body is connected, clamped or materially bonded to the stabilizer mount.

9. The system as claimed in claim 1, wherein the stabilizer mount is of multi-part design and multi-layer design.

10. The system as claimed in claim 1, wherein the stabilizer mount has at least one metal layer.

11. The system as claimed in claim 1, wherein the stabilizer mount has at least one rubber layer, and the at least one rubber layer is arranged between two metal layers.

12. The system as claimed in claim 1, wherein the stabilizer mount is configured to be connected or clamped to the stabilizer.

* * * * *